United States Patent
Iwadate (10) Patent No.: US 11,243,727 B2
(45) Date of Patent: Feb. 8, 2022

(54) PRINTING APPARATUS HAVING A STANDY STATE, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yasuhiro Iwadate, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/847,701

(22) Filed: Apr. 14, 2020

(65) Prior Publication Data
US 2020/0341707 A1 Oct. 29, 2020

(30) Foreign Application Priority Data
Apr. 25, 2019 (JP) .............................. JP2019-084434

(51) Int. Cl.
*G06F 3/12* (2006.01)

(52) U.S. Cl.
CPC .......... *G06F 3/1247* (2013.01); *G06F 3/1206* (2013.01); *G06F 3/1245* (2013.01)

(58) Field of Classification Search
CPC .... G06F 3/1247; G06F 3/1245; G06F 3/1206; G06F 3/1215; G06F 3/1285; G06K 15/1817; G06K 15/1823; G06K 15/1861
See application file for complete search history.

(56) References Cited

U.S. PATENT DOCUMENTS

| | | | | |
|---|---|---|---|---|
| 9,164,715 B2* | 10/2015 | Soriano | ................... | G06F 3/126 |
| 2011/0242555 A1* | 10/2011 | Nakajima | .......... | G06K 15/1822 358/1.9 |
| 2015/0242725 A1* | 8/2015 | Kurose | ............. | G06K 15/1823 358/1.2 |
| 2016/0103637 A1* | 4/2016 | Matsui | .................. | G06F 3/1206 358/1.18 |
| 2017/0253042 A1* | 9/2017 | Takahashi | ............ | B41J 2/04573 |
| 2019/0126625 A1* | 5/2019 | Kumagai | ............. | G06K 15/102 |

FOREIGN PATENT DOCUMENTS

JP          6241078 A        12/2017

OTHER PUBLICATIONS

English Machine Translation of JP Patent 6241078 B2 (Takahashi, Published Dec. 15, 2014) (Year: 2014).*

* cited by examiner

*Primary Examiner* — Juan M Guillermety
(74) *Attorney, Agent, or Firm* — Venable LLP (57) ABSTRACT

A printing apparatus performs conversion processing that converts input data corresponding to a page into image data, executes a predetermined operation for transition of a printhead to a printing standby state, in a case where image data is delayed, performs holding processing that holds the image data in a data memory, and performs retaining processing until an amount of image data held in the data memory exceeds a predetermined amount. The printing apparatus also outputs the image data in the data memory in a case where the amount of image data held in the data memory exceeds the predetermined amount, and executes printhead printing based on the output image data. In a case where input data still remains, the conversion processing for the remaining input data is performed concurrently with the printing based on the output image data.

14 Claims, 4 Drawing Sheets

FILE FORMAT AND RETAIN CONDITION

|  | PS | PDF | TIFF | Raster |
|---|---|---|---|---|
| RETAINING DETERMINATION SIZE [Mbyte] | 10 | 10 | 5 | 20 |
| MAXIMUM RETAINED COUNT [Page] | 7 | 7 | 3 | 3 |

FIG. 5

PRINT SETTING

START PRINTING AUTOMATICALLY WHEN DATA FOR FOLLOWING PAGE COUNT IS OBTAINED

7 PAGES

● PS  ○ PDF  ○ TIFF  ○ Raster

PRINTING APPARATUS HAVING A STANDY STATE, CONTROL METHOD, AND NON-TRANSITORY COMPUTER-READABLE STORAGE MEDIUM

BACKGROUND OF THE INVENTION

Field of the Invention

The present invention relates to a printing control technique for a printing apparatus.

Description of the Related Art

An inkjet printer that executes printing by discharging ink toward a printing medium performs a "capping" process of covering nozzle surfaces with a head cap by moving an inkjet head to a maintenance mechanism independently of an operation of discharging ink to the printing medium. This can prevent clogging of the nozzles of the inkjet head. A capping process is basically a process of opening the cap at the start of printing and closing the cap at the end of printing. On the other hand, even during printing, capping is sometimes performed when, for example, a network environment is unstable or a rendering process for print data takes a long time.

Japanese Patent No. 6241078 discloses a printer that performs a flashing operation of discharging ink while the nozzle surfaces of the head are capped. Japanese Patent No. 6241078 discloses a technique of determining whether to execute flashing, based on the elapsed time from the immediately preceding execution of flashing to the current time (the start time point of printing or a page delimiter timing).

As in the technique disclosed in Japanese Patent No. 6241078, frequently performing an operation for transition to a printing standby state such as a capping process will greatly reduce the throughput.

SUMMARY OF THE INVENTION

The present invention provides a technique that can prevent frequent execution of an operation for transition to a printing standby state during printing.

According to one aspect of the present invention, there is provided a printing apparatus comprising: one or more processors; and one or more memories that stores a computer-readable instruction for causing, when executed by the one or more processors, the printing apparatus to function as: a conversion unit configured to perform conversion of predetermined data corresponding to a print target page into image data; a printing unit configured to print the image data converted by the conversion unit on a printing medium; an execution unit configured to execute a predetermined operation for transition of the printing unit to a printing standby state based on a delay in the conversion by the conversion unit; and a holding unit configured to hold the image data converted by the conversion unit, wherein the conversion unit repeatedly executes the conversion for the predetermined data corresponding to each of a plurality of pages until an amount of image data held by the holding unit increases equal to or more than a predetermined amount, and the holding unit holds image data corresponding to each of the plurality of pages, which is converted by the repeatedly executed conversion, and wherein the printing unit prints the image data based on a fact that the amount of image data held in the holding unit increases equal to or more than the predetermined amount.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that this embodiment will exemplify a line head inkjet printer.

A serial head inkjet printer performs printing by discharging ink while scanning an inkjet head in a direction perpendicular to the conveying direction of a printing medium conveyed on a platen. The serial head inkjet printer can move the inkjet head to the maintenance mechanism arranged adjacent to the platen, and hence can quickly perform capping even during printing, resulting in a relatively small decrease in throughput.

In contrast, a line head inkjet printer performs printing by discharging ink in synchronism with an operation of conveying a printing medium passing between the platen and the inkjet head while keeping the inkjet head at rest on the platen. As described above, the line head inkjet printer keeps the inkjet head at rest during printing, so that when performing capping during printing, the printer needs to perform an additional operation of moving the inkjet head to the maintenance mechanism. For this reason, performing capping during printing in the line head inkjet printer will greatly reduce the throughput.

Accordingly, this embodiment will exemplify processing for preventing the execution of an operation for transition to the printing standby state (capping or the like) during printing. Note, however, that the processing in the embodiment may be applied to serial head inkjet printers as well as line head inkjet printers.

(Apparatus Arrangement)

Figure 1:
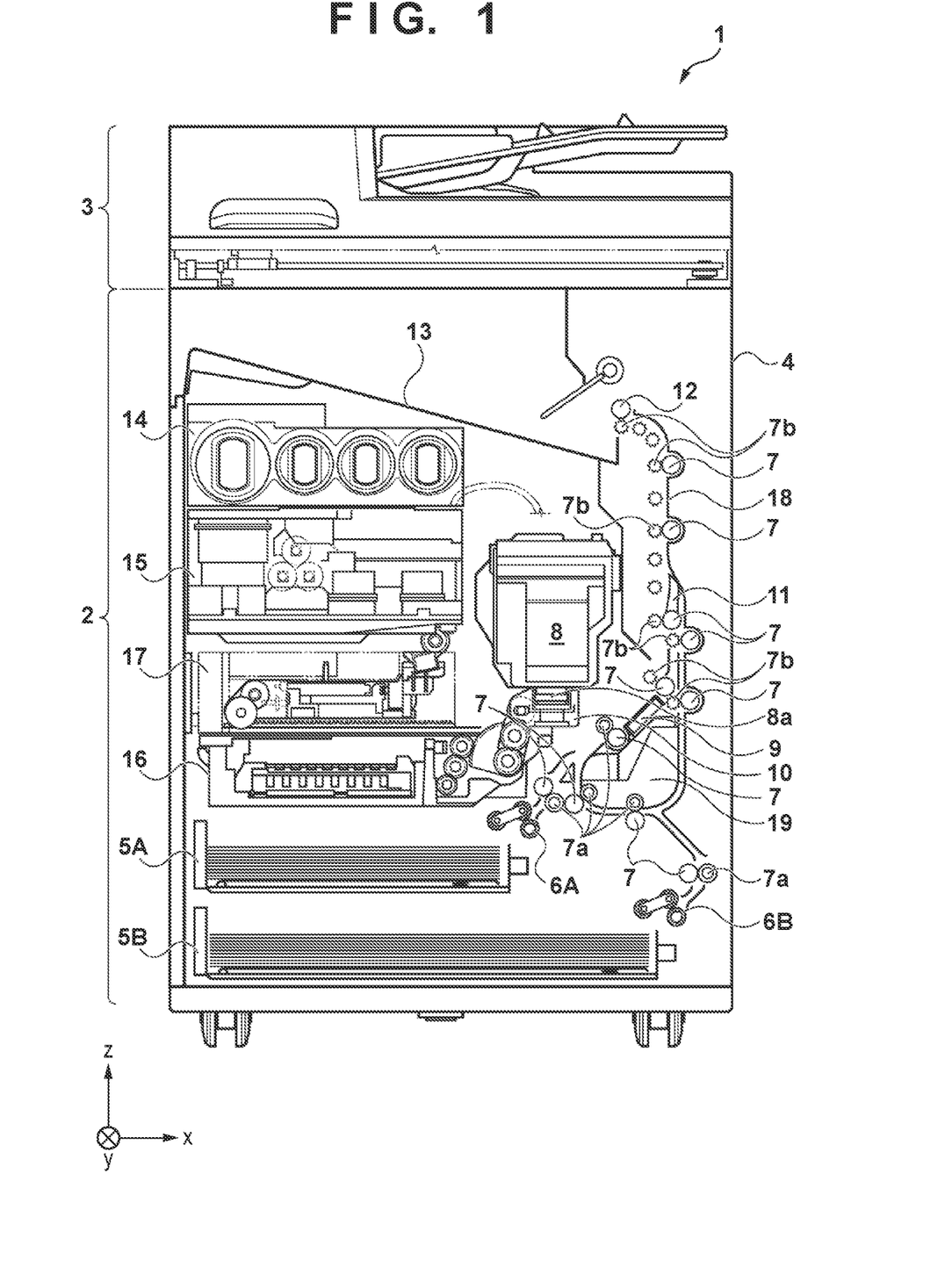
FIG. 1 is a view showing an example of the hardware arrangement of a printing apparatus.

FIG. 1 shows an example of the hardware arrangement of a printing apparatus 1 according to this embodiment. The printing apparatus 1 is an inkjet printing apparatus. Referring to FIG. 1, the x and y directions represent the horizontal direction, and the z direction represents the vertical direction. Note that the y direction (the direction perpendicular to the drawing surface) corresponds to the direction in which orifices are arrayed on a printhead 8 (to be described later).

The printing apparatus 1 is a multi-function peripheral including a printer unit 2 and a scanner unit 3. The printer unit 2 and the scanner unit 3 can execute various processes concerning printing operations and reading operations independently or in cooperation with each other. The scanner unit 3 includes an ADF (Auto Document Feeder) and an FBS (Flat Bed Scanner). The scanner unit 3 can read (scan) an original automatically fed by the ADF and read an original placed on the original table of the FBS by the user. Although the printing apparatus 1 is exemplified as the multi-function peripheral including both the printer unit 2 and the scanner unit 3, the printing apparatus 1 need not have, for example, the scanner unit 3. FIG. 1 shows the state of the printing apparatus 1 in a standby state in which the apparatus is performing neither a printing operation nor a reading operation.

The printer unit 2 includes a first cassette 5A and a second cassette 5B which are detachably installed in a bottom portion of a housing 4 on the lower side in the vertical direction to store printing media (cut sheets) S. For example, relatively small printing media up to A4 size are stacked flat in the first cassette 5A, and relatively large printing media up to A3 size are stacked flat in the second cassette 5B. The printer unit 2 further includes a first feeding unit 6A that is arranged near the first cassette 5A and feeds printing media, stored in the first cassette 5A, one by one and a second feeding unit 6B that is arranged near the second cassette 5B and feeds printing media, stored in the second cassette 5B, one by one. When a printing operation is to be performed, the printing medium S is selectively fed from either the first cassette 5A or the second cassette 5B.

The printer unit 2 includes conveyance rollers 7, an ejection roller 12, pinch rollers 7a, spurs 7b, a guide 18, an inner guide 19, and a flapper 11, which constitute a conveyance mechanism for guiding the printing medium S in a predetermined direction. The printer unit 2 also includes an ejection tray 13 that receives and holds the printing media S conveyed and having undergone printing operations, with the printing media S being stacked on each other. The printer unit 2 includes the printhead 8, a platen 9, an ink tank unit 14, and an ink supply unit 15, which are used to execute a printing operation of discharging ink to the printing medium S. The printer unit 2 includes a cap unit 10, a maintenance unit 16, and a wiping unit 17, which are used for maintenance such as capping for the printhead 8.

The conveyance rollers 7 are driving rollers that are arranged upstream and downstream of the printhead 8 and are driven by a conveyance motor (not shown). The pinch rollers 7a are driven rollers that rotate, together with the conveyance rollers 7, while nipping the printing medium S. The ejection roller 12 is a driving roller that is arranged downstream of the conveyance rollers 7 and driven by a conveyance motor (not shown). The spurs 7b hold and convey the printing medium S together with conveyance rollers 7 and the ejection roller 12 arranged downstream of the printhead 8. The guide 18 is provided on the conveyance path of the printing medium S to guide the printing medium S in a predetermined direction. The inner guide 19 is a member extending in the y direction, which has a curved side surface and guides the printing medium S along the side surface. The flapper 11 is a member for changing the conveyance direction of the printing medium S when performing double-sided printing. The ejection tray 13 is a tray for stacking and holding the printing media S having undergone printing operations and ejected by the ejection roller 12.

The printhead 8 is an inkjet printhead of a line head type, which has a plurality of orifices that discharge ink in accordance with print data and are arranged along the y direction in FIG. 1 in an array corresponding in number to the width of the printing medium S. When the printhead 8 is at a standby position, for example, an orifice surface 8a of the printhead 8 faces downward in the vertical direction as shown in FIG. 1 and is capped by the cap unit 10. In a printing operation, the direction of the printhead 8 is changed to make the orifice surface 8a face the platen 9. The platen 9 is formed from a flat plate extending in the y direction and supports, from the back surface, the printing medium S subjected to a printing operation by the printhead 8.

The ink tank unit 14 stores inks of one or more colors (for example, four colors) to be supplied to the printhead 8. The ink supply unit 15 is provided midway along a channel connecting the ink tank unit 14 to the printhead 8, and adjusts the pressure and flow rate of ink in the printhead 8 within proper ranges. The printing apparatus 1 has a circulating ink supply system. The ink supply unit 15 adjusts the pressure of ink supplied to the printhead 8 and the flow rate of ink recovered from the printhead 8 within proper ranges. The maintenance unit 16 includes the cap unit 10 and the wiping unit 17 and actuates them at predetermined timings to perform a maintenance operation for the transition of the printhead 8 to the printing standby state. This maintenance operation includes capping and wiping. In capping, the cap unit 10 caps the ink discharge surface of the printhead 8. In wiping, the wiping unit 17 wipes ink adhering to the ink discharge surface of the printhead 8 while capping is performed.

As described above, a predetermined timing at which a maintenance operation is performed includes a timing based on a delay in RIP processing (to be described later). That is, while a delay in RIP processing disables printing, a maintenance operation is executed.

Figure 2:
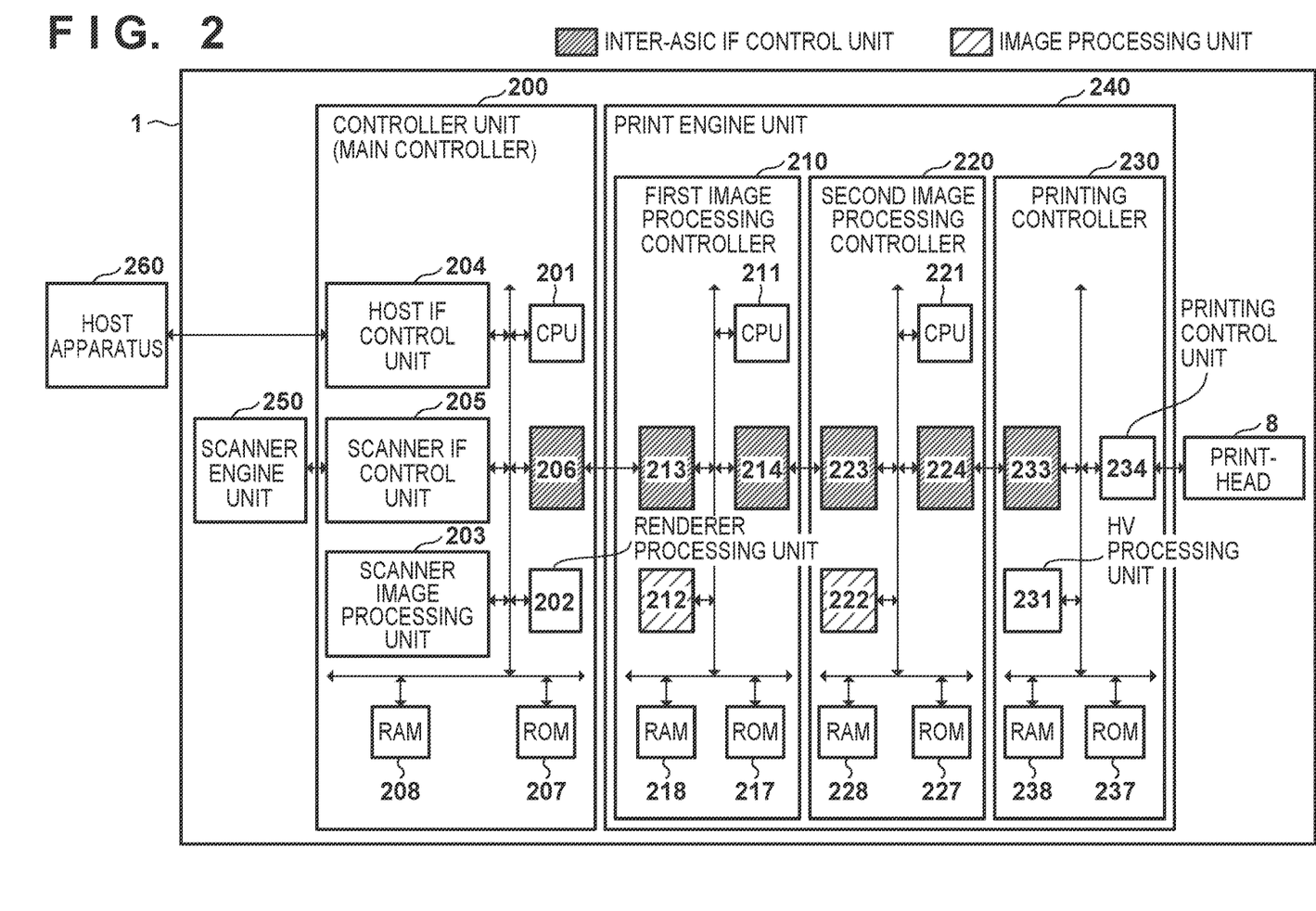
FIG. 2 is a block diagram showing an example of the software arrangement of the printing apparatus.

FIG. 2 shows an example of the functional arrangement of the printing apparatus 1. The printing apparatus 1 includes a print engine unit 240 that comprehensively controls the printer unit 2, a scanner engine unit 250 that comprehensively controls the scanner unit 3, and a controller unit 200 that comprehensively controls the overall printing apparatus 1. The print engine unit 240 controls various mechanisms in accordance with instructions from the controller unit 200. The print engine unit 240 includes, for example, a plurality of image processing controllers (a first image processing controller unit 210 and a second image processing controller unit 220) and a printing controller unit 230. The print engine unit 240 divides the image data generated by the controller unit 200 and causes a plurality of image processing controllers to concurrently execute image processing.

The controller unit 200 generates image data subjected to image processing by the first image processing controller unit 210 and the second image processing controller unit 220 based on input print jobs. The controller unit 200 functions as a main unit, and the first image processing controller unit 210 and the second image processing controller unit 220 function as sub-units for the controller unit 200.

A CPU (Central Processing Unit) 201 of the controller unit 200 is an arithmetic device that controls the overall controller unit in accordance with the programs and the like stored in a ROM 207. Note that in this embodiment, the CPU is merely an example, and an MPU (Micro Processing Unit), DSP (Digital Signal Processor), or the like may be used instead of or in addition to the CPU. That is, the CPU 201 can be one or more arbitrary processors. A renderer processing unit 202 generates one-page image data based on the job data transmitted from a host apparatus 260 via a host IF control unit 204. A scanner image processing unit 203 generates one-page image data based on the scan data transmitted from the scanner engine unit 250 via a scanner IF control unit 205.

A RAM 208 of the controller unit 200 temporarily stores the image data generated by the renderer processing unit 202 or the scanner image processing unit 203. The image data is then transmitted to the first image processing controller unit 210 or the second image processing controller unit 220. Note that an area in the RAM in which image data to be transmitted is stored will be referred to as a transmission buffer area hereinafter. The image data stored in the transmission buffer area is transmitted to the first image processing controller unit 210 via an inter-ASIC IF control unit 206 and stored in a RAM 218 of the first image processing controller unit 210. Note that an area in the RAM in which received image data is stored will be referred to as a reception buffer area hereinafter. Although this embodiment uses a communication system complying with PCI Express Standard® (that is, a serial communication system) as an inter-ASIC IF, the embodiment may use another type of communication system. In addition, the inter-ASIC IF control unit 206 (an inter-ASIC IF control unit 213) executes protocol processing and DMA control in PCI Express (to be referred to as PCIe hereinafter).

A CPU 211 of the first image processing controller unit 210 determines whether the image data stored in the reception buffer area in the RAM 218 is image data to be processed by the first image processing controller unit 210. That is, the CPU 211 of the first image processing controller unit 210 determines whether the image data stored in the reception buffer area in the RAM 218 is image data subjected to print data generation processing by the first image processing controller unit 210. Upon determining that the image data is image data subjected to print data generation processing, the CPU 211 instructs an image processing unit 212 to generate print data based on the image data stored in the reception buffer area in the RAM 218. In accordance with the instruction from the CPU 211, the image processing unit 212 generates print data based on the image data stored in the reception buffer area in the RAM 218, and stores the generated print data in the RAM 218. Note that an area in the RAM in which print data is stored will be referred to as a print buffer area hereinafter. The print data stored in the print buffer area in the RAM 218 is transmitted to the second image processing controller unit 220 via an inter-ASIC IF control unit 214 and stored in a print buffer area in a RAM 228.

If the CPU 211 of the first image processing controller unit 210 determines that the image data stored in the reception buffer area in the RAM 218 is not data subjected to print data generation processing, the image data is transferred to the second image processing controller unit 220. This transfer is performed via the inter-ASIC IF control unit 214. The reception buffer area in the RAM 228 of the second image processing controller unit 220 then stores this transferred image data.

An image processing unit 222 of the second image processing controller unit 220 generates print data based on the image data stored in the reception buffer area in the RAM 228. The print data generated by the image processing unit 222 is stored in the print buffer area in the RAM 228. Note that because the print data generated by the first image processing controller unit 210 is stored in the print buffer area in the RAM 228, one-page print data is finally generated in the print buffer area in the RAM 228. Upon completion of the generation of the one-page print data in the print buffer area in the RAM 228, a CPU 221 notifies the printing controller unit 230 of a printing start notification based on the one-page print data. After this printing start notification, the CPU 221 transmits the print data stored in the print buffer area in the RAM 228 to the printing controller unit 230 via an inter-ASIC IF control unit 224. This transmitted print data is stored in a RAM 238 of the printing controller unit 230.

The printing controller unit 230 receives the printing start notification and the print data from the second image processing controller unit 220, and stores the received print data in the RAM 238. An HV processing unit 231 executes HV conversion processing for the print data stored in the RAM 238. HV conversion processing is the processing of executing horizontal-vertical conversion of the arrangement of data. For example, this is the processing of rearranging laterally (horizontally) arranged print data into longitudinally (vertically) arranged print data. The HV processing unit 231 stores the print data rearranged by HV conversion processing in the RAM 238 again. A printing control unit 234 controls a printing operation of printing an image on a printing medium such as a paper sheet by transmitting the print data having undergone HV conversion processing and stored in the RAM 238 to the printhead 8.

The printing controller unit 230 or the controller (not shown) of the print engine unit 240 executes a maintenance operation for the printhead 8, including the above capping and wiping.

For example, a maintenance operation is executed under the condition that the printing controller unit 230 receives no print data from the second image processing controller unit 220 for a predetermined time. When, for example, a delay in RIP processing in the renderer processing unit 202 hinders printing, a maintenance operation is executed while printing is not completed. Frequently performing this maintenance operation during printing can greatly reduce the throughput.

(Procedure of Processing)

Figure 3:
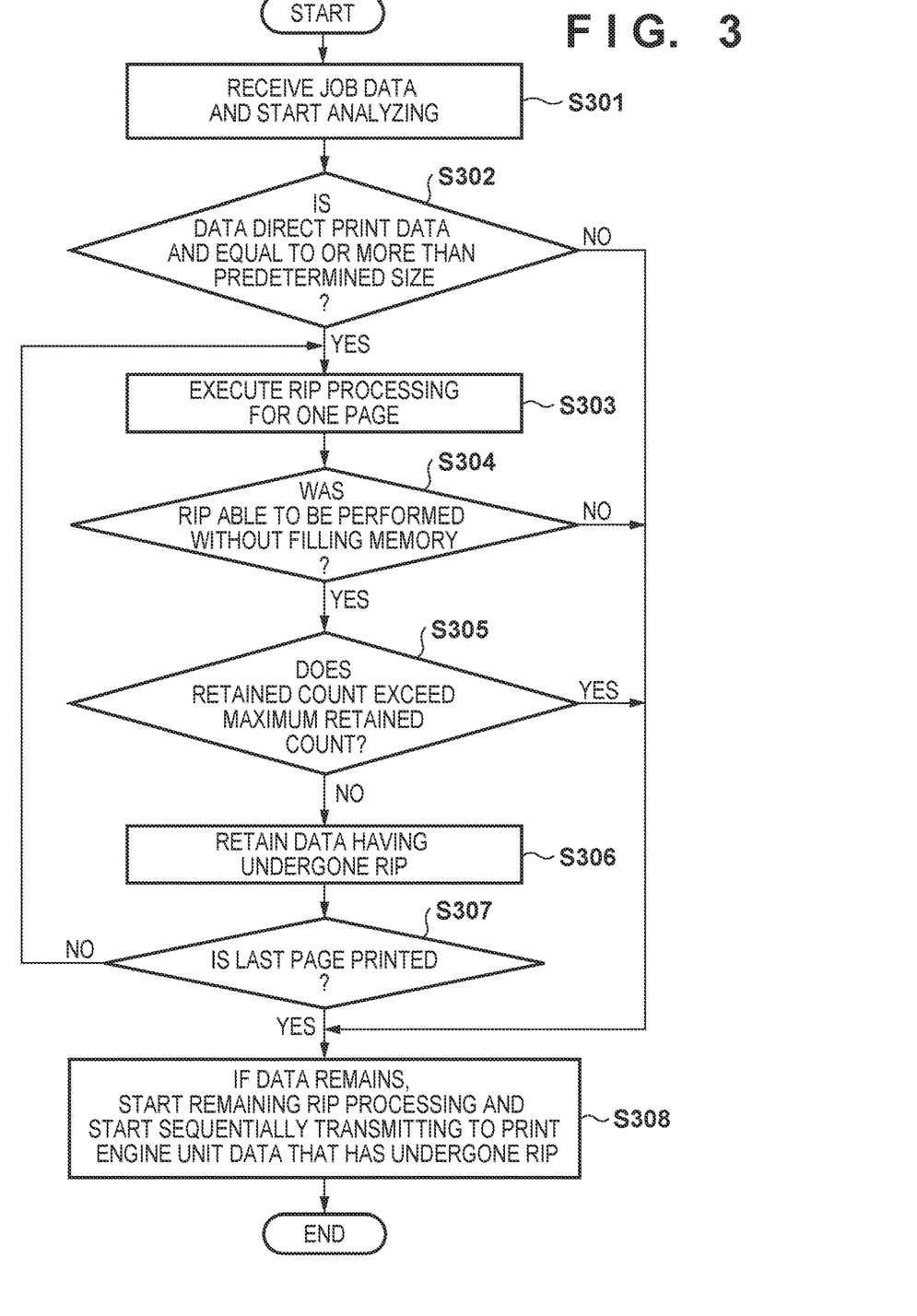
FIG. 3 is a flowchart showing an example of a procedure of processing executed by the printing apparatus.

An example of a procedure of processing executed by the printing apparatus 1 according to this embodiment will be described next with reference to FIG. 3. In this processing, the printing apparatus 1 executes a retaining process of retaining printing on a printing medium instead of immediately executing printing with respect to at least part of data which has not undergone RIP processing in the host apparatus 260 and needs to be converted into raster data in the printing apparatus 1. In this case, RIP stands for Raster Image Processing, which is the processing of converting input data into raster data (image data) that can be printed. The printing apparatus 1 retains generated image data until data fills the memory that holds image data corresponding to a designated number of pages or image data having undergone RIP processing, and then starts printing. This makes it possible to simultaneously print image data corresponding to a plurality of pages.

Assume that every time one-paged data undergoes RIP, the one-page data is printed. In this case, if data corresponding to 10 pages is to be printed, RIP processing standby state can occur nine times during printing. If a delay in RIP processing retains printing in this RIP standby state, a maintenance operation is performed during printing. Accordingly, in this embodiment, after data corresponding to a plurality of pages having undergone RIP processing is retained, the data having undergone RIP is transmitted to the engine unit. This can reduce the number of times of the occurrence of RIP processing standby state as compared with the above method of repeating RIP processing and printing for each page.

That is, when received data is sequentially printed, irregular factors such as a network environment and the rendering time of print data can cause a situation requiring a maintenance operation during printing. In contrast to this, this embodiment makes it difficult to cause such a situation. Accordingly, the control technique according to this embodiment can complete the printing of image data without delay and suppress the occurrence of a maintenance operation during printing. The printing apparatus 1 executes a maintenance such as capping while retaining image data. This makes it possible to execute a maintenance operation at proper interval. In addition, letting data having undergone RIP processing flow without delay can reduce the probability of the occurrence of a situation requiring capping during printing, thereby executing printing processing at high speed. This can prevent a decrease in throughput and execute a printing operation with high productivity. In addition, in this embodiment as well, when, for example, a delay in RIP processing retains printing, a maintenance operation is performed. It is therefore possible to prevent deterioration in print quality as well as preventing a decrease in throughput.

Figure 4:
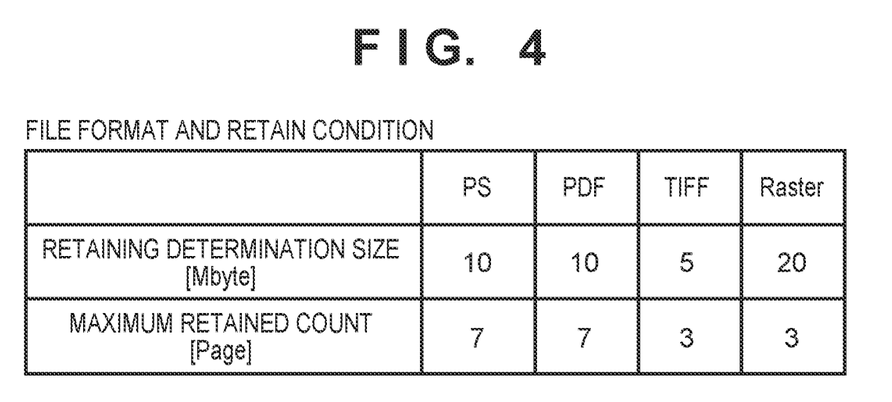
FIG. 4 is a view showing an example of conditions for retaining printing.

In the printing apparatus 1, based on job data received from the host apparatus 260, the host IF control unit 204 stores the job data in the RAM 208 or the ROM 207, and the renderer processing unit 202 starts analyzing the job data (step S301). Note that the analysis in step S301 can specify the total number of pages designated as print targets by the job data. The renderer processing unit 202 then determines whether the received job data is direct print data transmitted without via the printer driver and the file size is equal to or more than a predetermined size corresponding to the file format of the data (step S302). In this case, the "direct print data" is an example of data that has not undergone RIP processing, and data that has not undergone RIP processing, other than the direct print data, may be a determination target. Alternatively, data that has not undergone RIP processing in the printing apparatus 1 (that is, raster data) may be a determination target in step S302. That is, when data should be retained as in a case in which it takes much time to perform predetermined image processing or a network environment is unstable, the data may be a determination target in step S302 regardless of whether RIP processing is necessary in the printing apparatus 1. In addition, the determination in step S302 may be performed by using, for example, a relationship like that shown in FIG. 4 as the relationship between file formats and corresponding predetermined sizes. According to the example shown in FIG. 4, when the file format is PS (PostScript) or PDF (Portable Document Format), the corresponding predetermined size is 10 Mbytes. When the file format is TIFF (Tagged Image File Format), the corresponding predetermined size can be 5 Mbytes. When the raster data is included in the determination target in step S302, the predetermined size corresponding to the file format can be 20 Mbytes. Note that the values in FIG. 4 are merely examples, and different values may be designated. If the job data is neither direct print data nor data having a file size equal to or more than a predetermined size corresponding to the file format (NO in step S302), the renderer processing unit 202 executes printing processing without holding data corresponding to a plurality of pages in the memory in step S306 (step S308). Accordingly, when, for example, the job data is data that need not be processed by the renderer processing unit 202, such as data processed via the printer driver, executing printing processing without delay can prevent an increase in the time until the completion of printing processing. In addition, when the file size is sufficiently small, it is expected that printing processing can be performed in a short period of time regardless of a network state or image processing to be executed. Accordingly, executing printing processing for data with a file size less than a predetermined size without delay can prevent an increase in the time until the completion of printing processing.

If the job data is direct print data and has a file size equal to or more than a predetermined size (YES in step S302), the renderer processing unit 202 executes RIP processing for one page based on the job data (step S303). RIP processing is performed by using a conventional general method, and hence a description will be omitted. The renderer processing unit 202 determines whether RIP processing was able to be performed while a free space remains in the memory area holding data having undergone RIP processing (without filling the memory) (step S304). For example, the renderer processing unit 202 may determine, before RIP processing, whether there is a free space large enough to retain data in the memory area holding data after RIP processing. If it is not possible to perform RIP processing without filling the memory (NO in step S304), the renderer processing unit 202 executes printing processing without retaining data because it is not possible to retain more data (step S308). Note that the memory capacity of the memory area described above enables to retain data having undergone RIP which corresponds to a plurality of pages.

Upon determining that RIP processing was able to be performed without filling the memory (YES in step S304), the renderer processing unit 202 determines whether the current retained page count exceeds the maximum retained page count (step S305). For example, the maximum retained page count is set for each file format. An example of this correspondence relationship is provided as shown in FIG. 4. For example, the maximum retained page count corresponding to PDF can be 7 pages, and the maximum retained page count corresponding to TIFF and raster format can be 3 pages. Note that the values in FIG. 4 are merely examples, and different values can be used. If the current retained page count exceeds the maximum retained page count (YES in step S305), the renderer processing unit 202 executes printing processing without retaining more data (step S308). Upon determining that the current retained page count does not exceed the maximum retained page count (NO in step S305), the renderer processing unit 202 causes the print engine unit 240 to retain data in the controller unit 200 (step S306). The renderer processing unit 202 then determines whether the last page is printed (step S307). That is, the renderer processing unit 202 determines whether processing associated with all the series of print pages (the total number of pages as print targets specified in step S301) is completed. Upon determining that the processing associated with all the series of print pages is not completed (NO in step S307), the renderer processing unit 202 returns the process to step S303 to execute processing for the next page. In contrast to this, upon determining that the processing associated with all the series of print pages is completed (YES in step S307), the renderer processing unit 202 executes printing processing (step S308).

In step S308, the renderer processing unit 202 sequentially transmits data having undergone RIP processing to the print engine unit 240. For example, the renderer processing unit 202 sequentially reads out data from the memory area holding data having undergone RIP processing and transmits the data to the print engine unit 240. Data having undergone RIP processing is transmitted from the renderer processing unit 202 to the first image processing controller unit 210, the second image processing controller unit 220, and the printing controller unit 230 via the inter-ASIC IF control unit 206. A printing operation of printing an image on a printing medium such as a paper sheet is performed by using the printhead based on the data having undergone RIP processing. At this time, the renderer processing unit 202 may output first the data stored first in the memory area or may output first the page data stored later in the memory area. In addition, in steps S304 and S305, the renderer processing unit 202 may output first the page information when the memory is full or when the current retained page count exceeds the maximum retained page count and then output the page data stored in the memory area thereafter.

In step S308, printing processing is started when, for example, the memory becomes full or the current retained page count exceeds the maximum retained page count, and data may remain without having undergone RIP processing. In this case, the renderer processing unit 202 executes RIP processing for the data concurrently with the printing processing (after the printing processing).

According to the above description, the renderer processing unit 202 determines in step S304 whether RIP processing was able to be performed without filling the memory. However, this is not exhaustive. For example, if the free area in the memory area holding data having undergone RIP processing is smaller than a predetermined capacity, the renderer processing unit 202 may determine NO in step S304. In this case, the predetermined capacity may be set based on a ratio to the overall capacity of the memory area, for example, 30%, or may be set as a specific amount such as 10 Mbytes. Alternatively, as the predetermined capacity, an amount corresponding to the size of one-page data in the format currently processed may be used. According to this setting, when data having undergone RIP processing in step S303 is stored in the memory, if it is determined that the data of the next page cannot be stored in the memory, it is possible to execute printing processing for the data having undergone RIP processing.

As described above, the printing apparatus 1 according to this embodiment retains data having undergone RIP processing in the controller unit 200 until the data falls outside retaining conditions. This executes printing processing after data having undergone RIP processing exists in the printing apparatus 1. This makes it possible to prevent the occurrence of a situation requiring a capping process due to an irregular event concerning, for example, a network environment or the rendering time of print data during printing. Consequently, even when a head of a line head type is used, it is possible to suppress a decrease in throughput due to a capping process and improve the productivity of printing processing. Note that, for example, the print engine unit 240 can be configured to execute a maintenance operation such as a capping process for the printhead 8 after the completion of a printing operation. That is, when the controller unit 200 retains image data, the print engine unit 240 receives no image data. This allows the print engine unit 240 to start a maintenance operation immediately after the completion of printing processing. On the other hand, assume that data is transferred for each page. In this case, after one page is received, the next page may be received in a short period of time. In addition, when a plurality of page data arrive at the print engine unit 240, the next data may be generated during the execution of printing processing of a plurality of page data and arrive at the print engine unit 240 in a short period of time after the completion of printing processing. In such a case, when a maintenance operation is started immediately after the completion of printing processing, for example, it takes much time to start printing processing. This can degrade convenience. For this reason, the print engine unit 240 may start a maintenance operation if no next data arrives for a predetermined period of time after the completion of printing processing.

Note that the above arrangement of the embodiment is merely an example. For example, the embodiment may use an arrangement without a main controller, a plurality of image processing controllers, and a printing controller as in FIG. 2. That is, a printing apparatus in which maintenance can occur during printing can execute the above processing. That is, the printing apparatus can have an arbitrary apparatus arrangement that holds the image data generated based on job data without printing the data on a printing medium and can execute printing processing based on a situation in which a predetermined amount of image data is prepared. In this case, the predetermined amount can be an amount concerning the size of a memory area storing image data having undergone RIP processing as described above (the size of the filled memory area) or an amount corresponding to the maximum retained page count. This can prevent the occurrence of maintenance during printing. In addition, the printing apparatus can periodically execute a maintenance operation by properly setting the above predetermined amount concerning image data to be retained.

Figure 5:
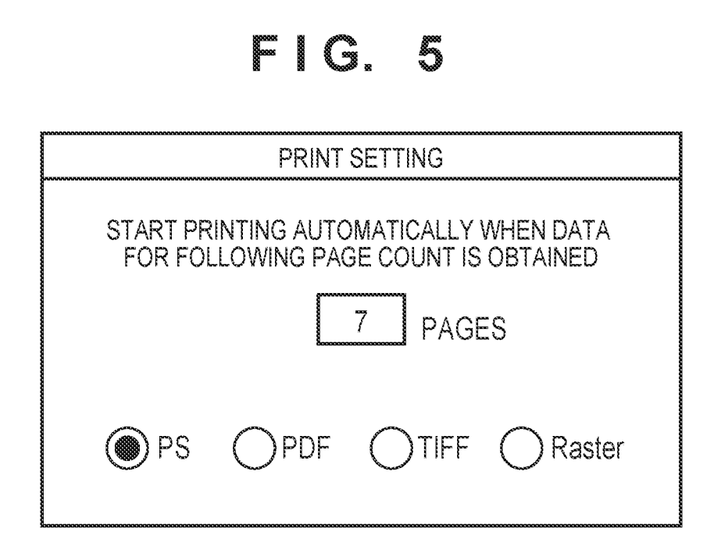
FIG. 5 is a view showing an example of a screen for accepting the setting of conditions for retaining printing.

Note that the printing apparatus may have a function of accepting the setting of a predetermined amount concerning image data to be retained. For example, as shown in FIG. 5, the printing apparatus may accept a user operation by causing a display unit (not shown) to display a screen for accepting the maximum retained page count of image data to be retained. Note that because this maximum retained page count can differ for each file format as described above, the printing apparatus can be configured to accept the setting of a maximum retained page count for each file format. In addition, the printing apparatus may be configured to set capacity information concerning a memory full state by accepting a user operation in the same manner. This makes it possible to flexibly operate the printing apparatus 1 by, for example, setting the predetermined amount to a small value when carefully checking print results and setting the predetermined amount to a large value when executing printing without interference with any maintenance operation. In addition, accepting the designation of a predetermined amount in the form of the number of pages allows the user to designate a predetermined amount in a user-friendly form. Accepting the designation of a predetermined amount in the form of a data size (a capacity corresponding to a memory full state) can flexibly control the functions of the printing apparatus 1 such as securing a sufficient memory area to be used for a function other than a printing function using a scanner or the like.

The above embodiment has exemplified the case in which a line head inkjet printer is used. However, for example, a serial head inkjet printer may execute the above processing. Using the processing method according to this embodiment can prevent the occurrence of capping due to factors such as a network state and a delay caused by image processing, thereby suppressing the consumption of ink in a maintenance operation.

The processing according to this embodiment can be applied to an arbitrary electronic device in which predetermined processing such as a maintenance operation can occur during a maintenance operation. That is, the electronic device can be configured to refrain from executing a main operation corresponding to the application purpose of the electronic device until a predetermined amount of data used by the main operation is held. This makes it possible to execute the main operation without delay and prevent the occurrence of a maintenance operation during the execution of the main operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084434, filed Apr. 25, 2019 which is hereby incorporated by reference herein in its entirety.

What is claimed is:

1. A printing apparatus comprising:
a printhead that prints on a printing medium;
one or more processors; and
one or more memories that stores a computer-readable instruction for causing, when executed by the one or more processors, the printing apparatus to:
perform conversion processing that converts input data corresponding to a page into image data;
execute a predetermined operation for transition of the printhead to a printing standby state, in a case where image data is delayed;
perform holding processing that holds the image data in a data memory;
perform retaining processing, in which the conversion processing for converting the input data corresponding to one of a plurality of pages into image data and the holding processing for holding the image data are repeatedly performed without outputting the image data from the data memory, until an amount of image data held in the data memory exceeds a predetermined amount; and output the image data in the data memory in a case where the amount of image data held in the data memory exceeds the predetermined amount,
wherein the printhead executes printing based on the output image data, and
wherein, in a case where input data still remains, the conversion processing for the remaining input data is performed concurrently with the printing based on the output image data.

2. The apparatus according to claim 1, wherein the predetermined amount is designated based on the number of the plurality of pages set as print targets by job data.

3. The apparatus according to claim 2, wherein the number of pages is designated based on file format used in the job data.

4. The apparatus according to claim 1, wherein the predetermined amount is based on a size of an area holding the image data in the data memory.

5. The apparatus according to claim 1, wherein the computer-readable instruction further causes, when executed by the one or more processors, the printing apparatus to accept setting of the predetermined amount.

6. The apparatus according to claim 1, wherein the predetermined operation is executed in a case in which no other image data reaches in a predetermined period after the printing based on the output image data.

7. The apparatus according to claim 1,
wherein the computer-readable instruction further causes, when executed by the one or more processors, the printing apparatus to determines a file size of job data including the plurality of pages,
wherein the retaining processing is performed if the file size of the job data is not less than a predetermined size, and the retaining processing is not performed if the file size of the job data is smaller than the predetermined size.

8. The apparatus according to claim 7, wherein the predetermined size is designated based on file format used in the job data.

9. The apparatus according to claim 1,
wherein the retaining processing is performed if job data including the plurality of pages is not received via a printer driver, and the retaining process the retaining processing is not performed if the job data is received via the printer driver.

10. The apparatus according to claim 1, wherein the printhead performs printing on the printing medium by discharging ink, and
an operation of capping an ink discharge surface of the printhead is executed as the predetermined operation.

11. The apparatus according to claim 1, wherein the output image data is converted into print data and the printhead executes printing according to the print data.

12. The apparatus according to claim 1, wherein the conversion processing is Raster Image Processing, and the image data is raster data.

13. A control method executed by a printing apparatus including a printhead that prints on a printing medium, the method comprising:
performing conversion processing that converts input data corresponding to a page into image data;
performing holding processing that holds the image data in a data memory;
executing a predetermined operation for transition of the printhead to a printing standby state, in a case where image data is delayed;

performing retaining processing, in which the conversion processing for converting the input data corresponding to one of a plurality of pages into image data and the holding processing for holding the image data are repeatedly performed without outputting the image data from the data memory, until an amount of image data held in the data memory exceeds a predetermined amount;

outputting the image data in the memory in a case where the amount of image data held in the data memory exceeds the predetermined amount, and executing, by the printhead, printing based on the output image data; and in a case where input data still remains, performing the conversion processing for the remaining input data concurrently with the printing based on the output image data.

14. A non-transitory computer-readable storage medium that stores a computer program for causing, when executed by one or more processors included in a printing apparatus that includes a printhead that prints on a printing medium, the printing apparatus to:

perform conversion processing that converts data corresponding to a page into image data;

perform holding processing that holds the image data in a data memory;

execute a predetermined operation for transition of the printhead to a printing standby state, in a case where image data is delayed;

perform retaining processing, in which the conversion processing for converting the input data corresponding to one of a plurality of pages into image data and the holding processing for holding the image data are repeatedly performed without outputting the image data from the data memory, until an amount of image data held in the data memory exceeds a predetermined amount output the image data in the memory in a case where the amount of image data held in the data memory exceeds the predetermined amount, and execute, by the printhead, printing based on the output image data; and in a case where input data still remains, perform the conversion processing for the remaining input data concurrently with the printing based on the output image data.

\* \* \* \* \*